March 19, 1940. A. H. OELKERS 2,194,447
SPRING PLANKLESS TRUCK
Filed Oct. 3, 1938
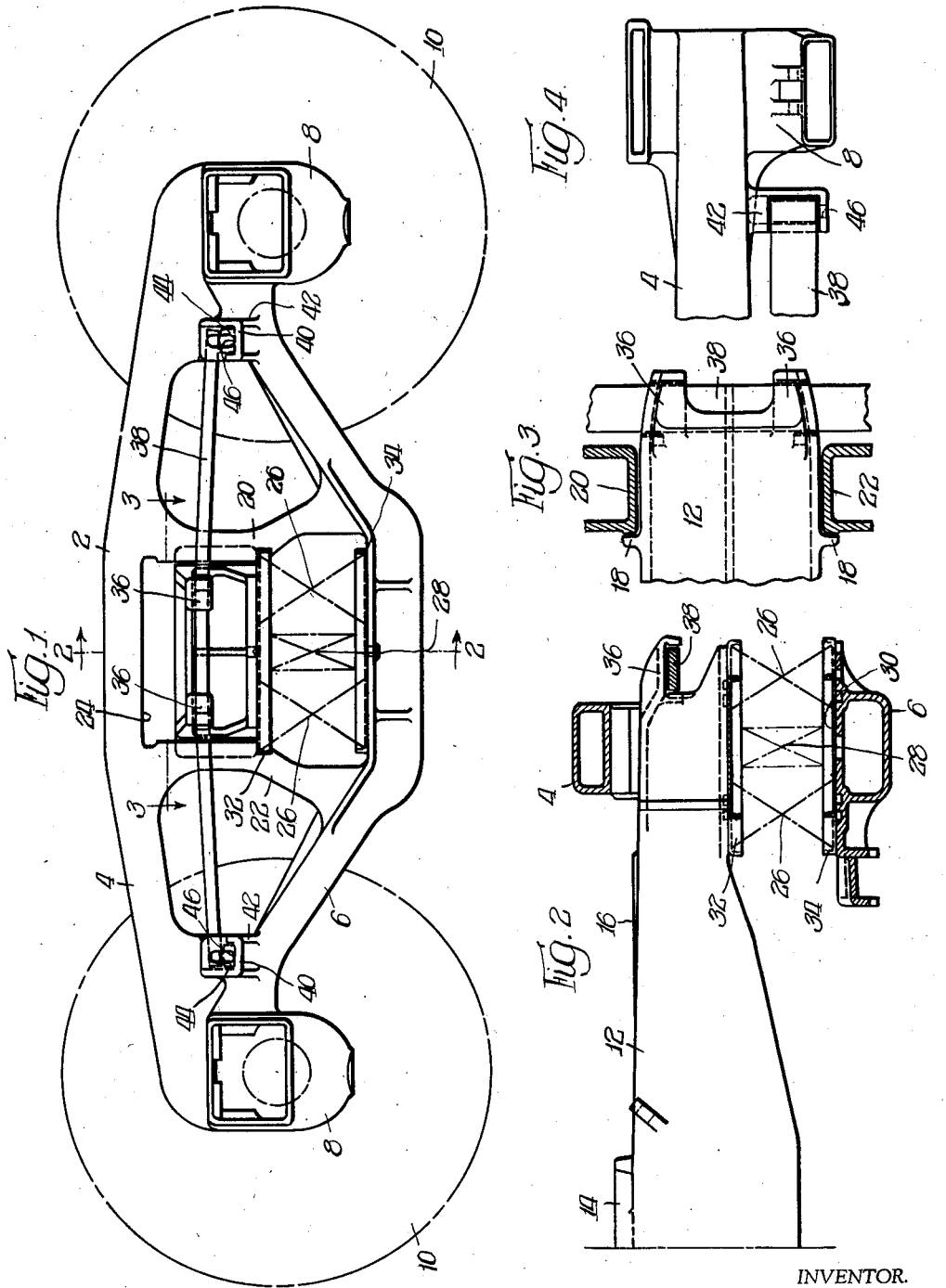
INVENTOR.
Alfred H Oelkers,
BY
ATTORNEY.

Patented Mar. 19, 1940

2,194,447

UNITED STATES PATENT OFFICE 2,194,447

SPRING PLANKLESS TRUCK

Alfred H. Oelkers, Chicago, Ill., assignor to American Steel Foundries, Chicago, Ill., a corporation of New Jersey Application October 3, 1938, Serial No. 232,909

18 Claims. (Cl. 105—197.2)

My invention relates to four wheel railway freight car trucks and more particularly to a design commonly designated the "quick wheel change type". In other words, my invention is directed to a type of railway freight car truck wherein it is feasible quickly to disengage the side frame from the bolster and so dismantle the truck as to permit the insertion of a new wheel and axle assembly. Such an arrangement requires that the side frames be held square solely by the bolster or load carrying member in conjunction with the wheel and axle assemblies and the omission of the spring plank or any other member commonly securing together the two side frames. In such a quick wheel change truck it is necessary for reasons of safety that provision be made to prevent the bolster's accidental disengagement from the side frame inasmuch as freight car trucks are commonly subjected to very severe usage including such bouncing of the parts as might disengage the members retaining the truck in assembly.

In the conventional type of freight car truck with spring plank, the latter acts as a tie between the two side frames whereby they are kept properly spaced, held parallel to each other and are prevented from spreading. In some of the constructions of spring plankless trucks placed in service in recent years the engagement between the bolster and the side frames consists of interlocking surfaces which rub on each other and which permit the side frames to spread or become misaligned to an increasing extent as these engaging surfaces wear.

An object of my invention is to provide a spring plankless truck wherein a frictionless means of interlocking the bolster with the side frame is provided by which the side frames are kept properly spaced and aligned.

Another object of my invention is to design a quick wheel change type of spring plankless truck wherein the engagement between the load carrying member and the spaced side frames will be such as to obviate the possibility of their disengagement in severe usage.

Still another object of my invention is to design a quick wheel change type of truck wherein the engagement between the side frame and the bolster will be of resilient character, thus pemitting some relative movement between the parts at the point of engagement.

A still further object of my invention is to design such a type of truck wherein the side frame will be of the type commonly known as truss and wherein the longitudinal shocks and at least a portion of the lateral shocks between the load carrying member and the side frames will be transmitted independently of the before-mentioned connection.

A more definite object of my invention is to provide a single resilient bar as a means of locking together the load carrying and side frame members of a four wheel freight car truck of the spring plankless quick wheel change type.

In the drawing which illustrates an embodiment of my device and wherein like reference characters are used to designate like parts—

Figure 1 is a side elevation of a four wheel freight car truck embodying my invention;

Figure 2 is a transverse sectional view of the truck structure shown in Figure 1, the section being taken substantially in the vertical plane bisecting the truck transversely thereof with certain of the parts shown in elevation;

Figure 3 is a fragmentary top plan view partly in section, the view being taken substantially in the horizontal plane indicated by the line 3—3 of Figure 1; and Figure 4 is a fragmentary top plan view showing the pocket in the end of the side frame within which is seated the spring member serving to retain the parts in assembly.

Describing my novel arrangement in greater detail, it comprises a truck having the side frame 2 of a well known truss design having the compression member 4 and the tension member 6 merging adjacent their ends in the integrally formed journal boxes 8, 8 forming the usual means of connection with the associated spaced supporting wheel and axle assemblies 10, 10. Joining the spaced side frames is the bolster 12, a general box-like structure of well known form, having the center bearing 14 serving as a means of engagement with the center bearing of the car body and the side bearings 16, said bolster having the usual guide lugs 18, 18 engaging the inner faces of the side frame columns 20 and 22, said columns being integrally formed with the before-mentioned tension and compression members and defining therewith the window opening 24 within which the end of said bolster is received. Said bolster end is seated in the usual manner on resilient means diagrammatically indicated at 26, 26 between which may be placed friction absorbing means diagrammatically indicated at 28, said resilient means and friction absorbing device being carried upon the spring seat 30 formed at the bottom of said window opening. The resilient means 26, 26 and friction absorbing device 28 may be retained in unit assembly by top and bottom spring plates 32 and 34, said spring plates being flanged and provided with positioning means in the usual manner.

At the end of the bolster on opposite sides thereof are formed the downwardly directed jaw members 36, 36 serving as a means of connection to the retaining bar 38. The ends of the bar 38 are received in pockets 40, 40, said pockets being formed in the brackets 42, 42 integrally formed with the side frame at the juncture of the compression member 4 and the tension member 6 adjacent the journal boxes at oposite ends of the frame. Within the pockets 40, 40 are received the blocks 44, the top of said blocks being of arcuate formation longitudinally of the truck and thus serving to diminish the effective length of the bar 38 as it is deflected downwardly. The blocks 44 serve as shimming means and may be replaced with thicker or thinner blocks as desired. The outer wall of the pocket 40 has the cored out opening 46 providing for drainage or escape of other extraneous matter.

The retaining bar 38 is of spring steel, and, having the relatively long length shown, is flexed through a much lower stress range than the coil springs or resilient means 26 which serve to support the major portion of the load, the vertical movement of the bolster being limited to the normal amount of deflection in the standard freight car truck, this being a maximum of somewhat less than two inches from free height to solid. It will be readily understood by those skilled in the art that the normal relationship between the nested resilient means supporting the bolster end and the side frame together with the guide lugs 18 engaging the inner faces of the columns will be such as to reduce substantially the lateral thrusts to which the bar 38 will be subjected. At the same time the said bar 38 is made of sufficient width to withstand such lateral thrusts without undue stresses.

In order to make a quick wheel change it is necessary only to flex or depress the retaining bar 38 sufficiently to disengage the bolster end therefrom, thus avoiding any possible delay. At the same time it will be readily apparent that a bouncing movement of the bolster will not disengage the same from the retaining bar 38 inasmuch as said retaining bar is of resilient character and will be normally urged into engagement with the jaws 36 of the bolster.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a four wheel railway car truck, a truss side frame comprising tension and compression members merging adjacent their ends with integral journal boxes, column guides defining with said members a bolster opening, a bolster end projecting therethrough and having jaw means thereon, guide lugs on said bolster end engaging the inboard edges of said column guides, a spring group comprising a friction absorbing device seated on said tension member and resiliently supporting said bolster, and lateral brackets comprising pockets integrally formed on said side frame between the junctures of said members and the adjacent journal boxes and substantially in line therewith, shimming means positioned on said pockets and having top surfaces convex longitudinally of said truck, and a flexible retaining bar received in the jaws of said bolster with its ends positioned in said pockets on said shimming means, said guide lugs transmitting lateral thrusts from said bolster to said side frame in one direction and said jaws and bar being adapted to transmit lateral thrusts from said bolster to said side frame principally in the opposite direction.

2. In a four wheel railway car truck, a truss side frame comprising tension and compression members merging adjacent their ends with integral journal boxes, column guides defining with said members a bolster opening, a bolster end projecting therethrough and having jaw means thereon, guide lugs on said bolster end engaging the inboard edges of said column guides, a spring group comprising a friction absorbing device seated on said tension member and supporting said bolster, lateral brackets comprising pockets integrally formed on said side frame between the junctures of said members and the adjacent journal boxes and substantially in line therewith, and a retaining bar in the form of a flexible member having its ends seated in said pockets and intermediate portions received in said jaw means adjacent said columns, said retaining bar serving to retain said bolster end in said openings, said guide lugs being adapted to transmit lateral thrusts from said bolster to said side frame at said column guides and said retaining bar being adapted to transmit lateral thrust from said bolster to said side frame by engagement therewith at the ends of said bar.

3. In a four wheel railway car truck, spaced truss type side frames each having tension and compression members merging at points adjacent their ends with integral journal boxes, and spaced columns forming with said members a bolster opening, outboard brackets with pockets on each of said frames adjacent the junctures of said members, shimming means seated in said pockets and comprising top surfaces convex longitudinally of said truck, and a load carrying member having its ends received in said openings and comprising lugs abutting the inboard edges of said columns, each end of said load carrying member having jaw means projecting outwardly of said columns and flexible retaining bars having their ends positioned in said pockets and points intermediate their ends received in said jaw means respectively, said lugs transmitting lateral thrusts from said load carrying member in one direction only to each side frame and said flexible retaining bars being adapted to transmit lateral thrust from said load carrying member to each of said side frames in the opposite direction, between said journal boxes and said points of mergence respectively.

4. In a four wheel railway truck, a truss side frame having top and bottom members merging at points adjacent their ends, integral journal boxes, pocket means formed on said frame outboard therefrom between said points of mergence and the adjacent journal boxes respectively, shimming means seated in said pockets and comprising top surfaces convex longitudinally of said frame, integral columns forming with said top and bottom members a central opening, a load carrying member received in said opening with lugs abutting the inboard edges of said columns and retaining means projecting outboard thereof, and a flexible retaining bar having its ends seated on said shimming means in said pockets and points intermediate its ends received in said jaws and having clearance from the outboard edges of said columns, said lugs affording a means of transmitting lateral thrusts from said load carrying member to said side frame in one direction lyon and said retaining bar affording a means of transmitting lateral thrusts from said load carrying member to said side frame in both directions.

5. In a four wheel railway car truck, a truss side frame comprising tension and compression members merging adjacent their ends with integral journal boxes, column guides defining with said members a bolster opening, a bolster end projecting therethrough and having jaw means thereon, guide lugs on said bolster and having abutment with said column guides, a spring group comprising a friction absorbing device seated on said tension member and supporting said bolster, and lateral brackets comprising pockets integrally formed on said side frame between the junctures of said members and the adjacent journal boxes, and a retaining bar in the form of a flexible member having its ends seated in said pockets and intermediate portions received in said jaw means, said guide lugs transmitting lateral thrusts from said bolster end to said side frame through said column guides and said retaining bar transmitting lateral thrusts from said bolster end to said side frame adjacent the junctures of said members through said pockets.

6. In a four wheel railway car truck, a truss side frame having tension and compression members merging adjacent their ends, integral journal boxes, integral columns forming therewith a bolster opening, spring means on said compression member beneath said opening, a bolster end projecting through said opening with lugs abutting the inboard edges of said columns and outboard jaw means adjacent each of said columns, and a flexible retaining bar received in said jaw means and having its ends positioned on means on said side frame between the junctures of said members respectively and the adjacent journal boxes, said means comprising shimming blocks having top surfaces convex longitudinally of said truck, said lugs affording a means of transmitting lateral thrusts from said bolster end to said side frame in one direction at said columns and said retaining bar affording means of transmitting lateral thrusts from said bolster end to said side frame adjacent the junctures of said members.

7. In a four wheel railway car truck, spaced side frames of truss type each comprising tension and compression members merging at points adjacent their ends, integral journal boxes, integral columns forming with said members a bolster opening, a bolster having its ends projecting through said openings, lugs on said bolster abutting the inboard edges of said columns, retaining means on said bolster ends projecting outwardly of said columns and flexible retaining bars having their ends positioned on said side frames adjacent the ends thereof respectively, and between said points of mergence and said journal boxes, and points intermediate their ends received in said retaining means respectively, said lugs being adapted to transmit lateral thrusts from said bolster to each of said side frames in one direction only through said columns and said retaining bars being adapted to transmit lateral thrusts to each of said side frames in the reverse directions.

8. In a four wheel railway car truck, spaced truss type side frames each having tension and compression members merging adjacent their ends, integral journal boxes and spaced columns forming with said members a bolster opening, outboard brackets with pockets on each of said frames adjacent the junctures of said members and between said junctures and said boxes, and a load carrying member having its ends received in said openings and comprising means abutting the inboard edges of said columns, each end of said bolster having jaws projecting outwardly of said columns, and flexible bars having their ends positioned in said pockets and points intermediate their ends received in said jaws, respectively, said means being adapted to transmit lateral thrusts from said load carrying member to each of said side frames in a given direction at said columns and said bars being adapted to transmit lateral thrusts from said load carrying member to said side frames in the opposite directions through said pockets.

9. In a four wheel railway car truck, a truss side frame having top and bottom members merging adjacent their ends, integral journal boxes, outboard pockets on said frame between said points of mergence and the adjacent journal boxes respectively, integral spaced columns forming with said top and bottom members a central opening, a load carrying member having an end received in said opening with means abutting the inboard edges of said columns and downwardly directed jaws projecting outboard adjacent each of said columns, and a flexible retaining bar having its ends seated in said pockets and points intermediate its ends received in said jaws with clearance from the outboard edges of said columns, said means serving to transmit lateral thrusts from said load carrying member to said side frame in a given direction at said columns and said retaining bar serving to transmit lateral thrusts from said load carrying member to said side frame in the reverse direction at said points of mergence.

10. In a four wheel railway car truck, a truss side frame having top and bottom members merging adjacent their ends with integral journal boxes, and integral columns forming with said members a central opening, resilient means seated on said tension member below said opening, a load carrying member projecting through said opening with lugs abutting the inboard edges of said columns and retaining means projecting outboard thereof, and a flexible retaining bar having its ends seated on said frame between the junctures of said top and bottom members and adjacent journal boxes respectively and engaging said jaw means outwardly of said columns and having clearance therefrom, said lugs being adapted to transmit lateral thrusts from said load carrying member to said side frame adjacent said opening and the ends of said retaining bar being adapted to transmit lateral thrusts from said load carrying member to said side frame between said junctures and said journal boxes respectively.

11. In a four wheel railway truck, a truss side frame with tension and compression members merging adjacent their ends with integral journal boxes, integral columns forming therewith a bolster opening, pockets on said side frames between the junctures of said members and adjacent journal boxes respectively, a bolster end projecting through said opening with means abutting the inboard edges of said columns and jaws projecting outwardly thereof, and a flexible retaining bar having its ends positioned in said pockets and intermediate portions received in said jaws, said means transmitting lateral thrusts from said bolster end to said side frame at opposite sides of said opening and said bar transmitting lateral thrusts from said bolster end to said side frame at opposite ends thereof through said pockets.

12. In a four wheel railway truck, a truss side frame having top and bottom members joined at their ends with integral journal boxes and forming with spaced integral columns a central opening therein, a load carrying member projecting through said opening with means abutting the inboard edges of said columns and jaws projecting outboard thereof, and a flexible retaining bar having its ends seated on said frame between the junctures of said top and bottom members and adjacent journal boxes respectively and having spaced points intermediate its ends received in said jaws, said means transmitting lateral thrusts to said side frame in a given direction at opposite sides of said opening and said retaining bar transmitting lateral thrusts to said side frame in the opposite direction at said seating points.

13. In a four wheel railway car truck, a truss side frame having a tension member and a compression member merging at points adjacent their ends with integral journal boxes, and spaced columns forming a bolster opening, a flexible retaining bar having its ends seated adjacent the ends of said side frame at the outboard side thereof between said points of mergence and the adjacent journal boxes respectively, a bolster end projecting through said opening and having means engaging said bar adjacent the middle thereof, said bolster end having guide lugs abutting the inner edges of said columns, said guide lugs serving to transmit lateral thrusts from said bolster through said columns adjacent the middle of said frame, and said bar serving to transmit lateral thrusts from said bolster end to said side frame adjacent the ends thereof between said points of mergence and said journal boxes.

14. In a four wheel railway car truck, a side frame having a compression member and a tension member merging at points adjacent their ends with integral journal boxes, and spaced columns forming a bolster opening, a resilient bar having its ends seated adjacent the ends of said frame at the outboard side thereof between said points of mergence and the adjacent journal boxes respectively and extending across said opening, a bolster extending through said opening and engaging said bar, guide lugs on said bolster abutting said columns and serving to transmit lateral thrusts in one direction thereto, said bar serving to transmit lateral thrusts from said bolster to said side frame in the opposite direction and at said seating points.

15. In a four wheel railway car truck, a side frame having tension and compression members merging at points adjacent their ends, a central bolster opening and integral journal boxes at the ends thereof, a resilient bar supported at the outboard side of said frame and connected at its ends adjacent said boxes, said bar extending past said opening and having clearance from the margins thereof, and a bolster extending through said opening and engaging said bar, said bolster having means abutting said columns for transmitting lateral thrusts in a given direction thereto and said bar affording means of receiving lateral thrusts from said bolster in the opposite direction and transmitting them to said side frame at the ends of said bar between said points of mergence and the adjacent journal boxes.

16. In a four wheel railway truck, a side frame having tension and compression members merging adjacent their ends, integral journal boxes, spaced columns forming with said members a bolster opening, a bolster extending through said opening and having means abutting said columns to transmit outboard thrusts, and a flexible bar affording means of transmitting inboard thrusts from said bolster to said side frame, said bar engaging said bolster outwardly of said opening adjacent its middle and having clearance from the margins of said opening whereby said bar affords a means of transmitting inboard thrusts from said bolster to said side frame between said points of mergence and the adjacent journal boxes respectively.

17. In a railway car truck, a side frame having tension and compression members merging at points adjacent their ends, integral journal boxes, spaced columns affording a bolster opening, seats on said side frame between said points of mergence and adjacent journal boxes respectively, a bolster extending through said opening and having means abutting said columns to transmit outboard thrusts thereto, jaw means on said bolster outboard of said opening, and a flexible retaining bar positioned on said seats having its middle portion engaged in said jaw means whereby said bar affords a means of transmitting inboad thrusts from said bolster to said side frame between said points of mergence and said journal boxes respectively.

18. In a railway car truck, a side frame with integral tension and compression members merging at points adjacent their ends with journal boxes, spaced columns forming a bolster opening, outboard seats on said frame between said points of mergence and adjacent journal boxes respectively, a bolster extending into said opening and having means abutting said columns to transmit outboard thrusts thereto, jaw means on said bolster outboard of said opening, and a flexible retaining bar positioned on said seats and received in said jaw means, said bar having clearance from said columns and thereby affording means of transmitting inboard thrusts from said bolster to said side frame between said points of mergence and said journal boxes respectively.

ALFRED H. OELKERS.